US009306740B2

(12) United States Patent
Bowes

(10) Patent No.: US 9,306,740 B2
(45) Date of Patent: Apr. 5, 2016

(54) SYSTEMS, METHODS, AND APPARATUS FOR A QUANTUM KEY DISTRIBUTION TELESCOPE

(75) Inventor: Benjamin Thomas Bowes, El Segundo, CA (US)

(73) Assignee: The Aerospace Corporation, El Segundo, CA (US)

( * ) Notice: Subject to any disclaimer, the term of this patent is extended or adjusted under 35 U.S.C. 154(b) by 161 days.

(21) Appl. No.: 13/046,024

(22) Filed: Mar. 11, 2011

(65) Prior Publication Data

US 2012/0230493 A1 Sep. 13, 2012

(51) Int. Cl.
*H04L 9/00* (2006.01)
*H04L 9/08* (2006.01)

(52) U.S. Cl.
CPC .................... *H04L 9/0858* (2013.01)

(58) Field of Classification Search
CPC ....... H04L 9/0858; H04L 9/08; H04L 9/0883; H04L 9/0836; H04L 9/0891; H04L 63/0428
USPC ......................................................... 380/278
See application file for complete search history.

(56) References Cited

U.S. PATENT DOCUMENTS

| 5,248,979 A | 9/1993 | Orme et al. |
| 5,359,446 A | 10/1994 | Johnson et al. |
| 5,606,444 A | 2/1997 | Johnson et al. |
| 6,181,450 B1 | 1/2001 | Dishman et al. |
| 6,487,294 B1 | 11/2002 | Alexander |
| 2001/0055389 A1* | 12/2001 | Hughes et al. ................ 380/44 |
| 2004/0082365 A1* | 4/2004 | Sabach et al. ................ 455/561 |
| 2008/0267635 A1* | 10/2008 | Kawamoto et al. ........... 398/141 |
| 2008/0292102 A1* | 11/2008 | Wang et al. .................. 380/275 |
| 2010/0166187 A1* | 7/2010 | Trifonov et al. .............. 380/279 |
| 2010/0290626 A1* | 11/2010 | Jenkins et al. ................ 380/278 |

OTHER PUBLICATIONS

Richard J. Hughes, et al. "Quantum cryptography for secure communications to low-earth orbit satellites." LANL Publication No. LA-UR-99-2741, Los Alamos National Laboratory, Los Alamos, New Mexico (1999).
Richard J. Hughes, et al. "Quantum cryptography for secure satellite communications." LANL Publication No. LA-UR-00-78, Los Alamos National Laboratory, Los Alamos, New Mexico (2000).
Richard J. Hughes, et al. "Practical free-space quantum key distribution over 10 km in daylight and at night." New Journal of Physics, vol. 4, p. 43 (2002).
Nicolas Gisin, et al. "Quantum Cryptography." Reviews of Modern Physics, vol. 74, p. 145 (2002).
Peter W. Shor, et al. "Simple Proof of Security of the BB84 Quantum Key Distribution Protocol." Physical Review Letters, vol. 84, No. 2 (2000).

(Continued)

*Primary Examiner* — Baotran N To
(74) *Attorney, Agent, or Firm* — Sutherland Asbill & Brennan LLP

(57) ABSTRACT

Certain embodiments of the invention may include systems, methods and apparatus for a quantum key distribution (QKD) telescope. According to an example embodiment of the invention, a method is provided for receiving a quantum key distribution (QKD) signal. The method can include collecting one or more QKD signals and one or more primary signals with a single telescope.

23 Claims, 8 Drawing Sheets

(56) References Cited

OTHER PUBLICATIONS

Charles H. Bennett, et al. "Quantum Cryptography: Public Key Distribution and Coin Tossing." International Conference on Computers, Systems, & Signal Processing, Bangalore, India (1984).

C. Erven, et al. "Entangled quantum key distribution over two free-space optical links." Optical Express, vol. 16, p. 16840 (2008).

Matthew P. Peloso, et al. "Daylight operation of a free space, entanglement-based quantum key distribution system." New Journal of Physics, vol. 11, p. 045007 (2009).

C. Bonato, et al. "Feasibility of satellite quantum key distribution." New Journal of Physics, vol. 11, p. 045017 (2009).

C. Bonato, et al. "Study of the quantum channel between earth and space for satellite quantum communications." Appearing in "Personal Satellite Services," Proceedings of Psats2009 and LNICST 15, p. 37-40, Springer, Berlin, Germany (2009).

Marco Mayer. "Hamamatsu Photonics receives CERN Award for its Avalanche Photodiodes APD," Hamamatsu Press Release (2003).

W. Heisenberg. "Uber den anschaulichen Inhalt der quantentheoretischen Kinematik und Mechanik," Mit 2 Abildungen (Eingegangen am 23. Marz 1927).

W.K. Wootters, et al. "A single quantum cannot be cloned," Letters to Nature, vol. 299 (1982).

* cited by examiner

SYSTEMS, METHODS, AND APPARATUS FOR A QUANTUM KEY DISTRIBUTION TELESCOPE

FIELD OF THE INVENTION

This invention generally relates to cryptography, and in particular to a telescope for quantum key distribution.

BACKGROUND OF THE INVENTION

Cryptographic quantum key distribution (QKD) can be utilized for generating and transmitting and/or receiving cryptographic keys with assured secrecy. QKD is based on the quantum nature of light, and any attempts to intercept and clone the quantum key information encoded in transmitted photons is forbidden due to the linearity of quantum mechanics and the Heisenberg uncertainty principle. In QKD, the quantum state of a photon may be associated with qubits (0 or 1), and these qubits can be used to form the bits associated with a cryptographic key.

Photonic QKD may take place over fiber optic networks, through free-space optical transmission, or through any other network capable of relaying photons. For free-space transmission, at least two telescopes are needed: one to transmit the QKD signal and one to receive the QKD signal. The sizes of these telescopes are determined by a number of parameters, including transmission distance, desired signal-to-noise ratio, chosen optical wavelength, and atmospheric conditions. Due to a number of these factors, including the size and weight of the QKD telescope, QKD has been precluded from use in satellite communications systems.

BRIEF SUMMARY OF THE INVENTION

Some or all of the above needs may be addressed by certain embodiments of the invention. Certain embodiments of the invention may include systems, methods, and apparatus for a quantum key distribution telescope.

According to an example embodiment of the invention, a method is provided for receiving a quantum key distribution (QKD) signal. The method can include collecting one or more QKD signals and one or more primary signals with a single telescope.

According to another example embodiment, a system is provided for receiving one or more quantum key distribution (QKD) signals and one or more primary signals. The system includes a single telescope that collects one or more QKD signals and one or more primary signals. The system also includes intermediate optics that modify the one or more primary signals and the one or more QKD signals. The system includes one or more primary signal transceivers that receive and detect the one or more primary signals; and one or more QKD signal transceivers that receive and detect the one or more QKD signals.

According to another example embodiment, an apparatus is provided. The apparatus includes a single telescope that collects one or more quantum key distribution (QKD) signals and one or more primary signals. The single telescope may be a reflective telescope, a refractive telescope, or a catadioptric telescope.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying drawings, which are not necessarily drawn to scale, and wherein.

DETAILED DESCRIPTION OF THE INVENTION

Figure 1:
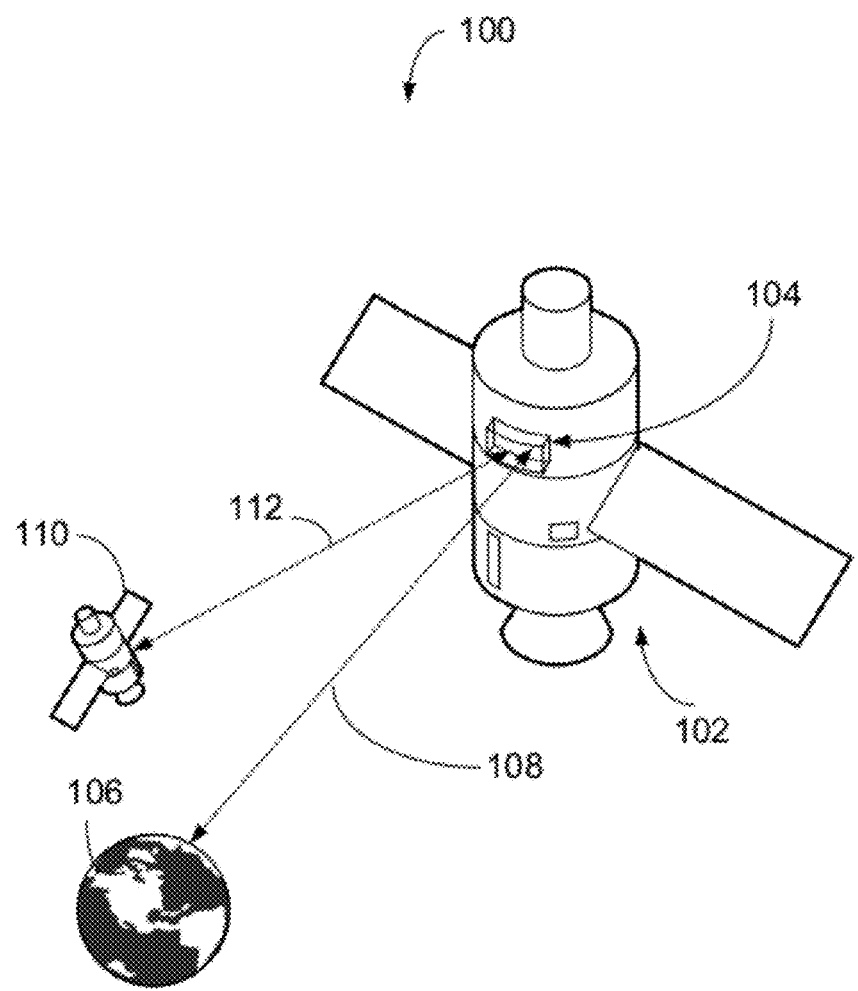
FIG. 1 is a diagram of an illustrative satellite communications system, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to example embodiments of the invention, a single telescope is utilized for receiving photons associated with QKD, and for receiving and/or imaging signals associated with the primary function of the telescope. For example, a primary function of the telescope may be to provide weather-related images for a weather satellite, or infrared images for remote sensing, etc. According to example embodiments, the QKD system telescope can use the same primary optic, mirror and/or lens as is used in the primary telescope. For example, by combining functions and sharing some of the large and heavy optics (mirrors, lenses, etc.), the extra bulk that would normally be required may be eliminated, making QKD a practical reality for use in satellites which have certain payload restrictions.

According to an example embodiment, a visible and/or near-infrared remote sensing satellite may be designed to have encrypted communications with ground-based stations or with other satellites over conventional radio frequency communication channels. According to an example embodiment, and to provide cryptographic flexibility, cryptographic keys may be passed to the operational, on-orbit satellite via ground-to-space QKD methods, rather than relying on launching a satellite with a finite number of cryptographic keys built in. In an example embodiment, if an adversary were to intercept and steal the keys, new keys can be made and quickly distributed.

According to an example embodiment, photons that are linearly polarized in one of two conjugate polarization bases (horizontal/vertical or +/−45 degrees) may form the quantum bits, or "qubits" of the cryptographic key. For example, the qubits may be represented by (1, 0)=(horizontal, vertical) or (1, 0)=(+45 degrees, −45 degrees). In an example embodiment, the transmitted signal is made of single photons, and the detectors are able to detect single photons. Due to the no-cloning theorem which itself follows from the Heisenberg uncertainty principle, relaying a cryptographic key in this manner is provably secure, whereas conventional cryptographic key distribution methods, such as couriers, are not provably secure.

According to an example embodiment, single photon qubits, at wavelength of about 780 nm, may be generated by pulsing a laser diode. According to another example embodiment, single photon qubits may also be generated by high attenuation of a laser signal. According to example embodiments, polarization may be imposed on the photons using optical polarizers.

Detection of the qubits, according to example embodiments of the invention, may be achieved using one or more silicon avalanche photodiodes (Si-APD). Si-APD, for example, from Hamamatsu Corporation of Japan, may be utilized to detect single photons by operating the Si-APD in Geiger mode.

According to example embodiments of the invention, two telescopes may be required to complete a QKD satellite communications system: a telescope on the ground and a telescope in space. In certain embodiments, the ground telescope may be less challenging to design and make within a limited budget because the components may be purchased from a variety of vendors, and size and weight restrictions are typically not an issue. However, according to certain example embodiments, the space telescope may be more difficult and expensive to build. For example, there are no vendors for space QKD telescopes and, due to size and weight challenges, a separate QKD telescope could cost as much money to design and build as a primary mission telescope system. Therefore, according to example embodiments of the invention, the QKD system may share many of the same optics utilized by the remote sensing telescope to gain a tremendous reduction in size, weight, power, and complexity of the satellite system while implementing a provably secure quantum key distribution system. According to certain example embodiments of the invention, a meter-class mirror may be needed for the QKD telescope system, so great reductions in weight and cost can be achieved by utilizing mirrors, lenses, or other components associated with the primary mission telescope to receive or transmit QKD signals.

According to example embodiments of the invention, the QKD signal may include a number of single bits, and the bits may be transmitted from one party to another via single photons having a certain quantum state, for example, polarization. In an example embodiment, the QKD depends on conveying binary information encoded in the polarization of the photons, but the polarization state sent is random and may change for each bit.

According to example embodiments, the wavelength of the transmitted photons associated with the QKD signal may be selected according to certain parameters and design aspects of the system. For example, it may be convenient to select a wavelength aligned with one of the atmospheric "windows" where the attenuation of the light (due to water and other atmospheric gases) is relatively minimal. According to an example embodiment, the QKD signal wavelength may also be chosen for simplifying the design of the receiver, for example, so that the QKD signals may be separated from other primary optical signals.

In one example embodiment, a wavelength (or wavelengths) around 780 nm may be convenient for generating and transmitting the QKD signals because commercial laser diodes are readily available by virtue of the consumer compact disk player market. According to an example embodiment, a wavelength (or wavelengths) around 780 nm may align with a water window for efficient transmission. According to an example embodiment, a transmission wavelength (or wavelengths) around 780 nm may also be convenient for designing dichroic beam splitters and other devices that can separate, by wavelength, the QKD signal from the primary signal. According to other example embodiments, a wavelength (or wavelengths) around 1550 nm (or any other convenient wavelength for that matter) may be utilized to address attenuation, cost, and other issues associated with the system.

According to example embodiments, which will be further discussed below, QKD signals may be color-coded. For example, separate lasers, each with a different wavelength, may be utilized in conjunction with corresponding polarizers to color code the QKD bits. Such application of color-coding may allow convenient separation and detection in the receiver, according to example embodiments. However, according to other example embodiments, the signals do not need to be color-coded for QKD to work.

In accordance with example embodiments of the invention, single photons may be generated and a polarization state imposed on them for use as encoding bits in a QKD signal. In an example embodiment, the single photon may be generated by heavily attenuating the output of a laser, or by using a non-linear optical parametric down conversion to produce entangled photons. A polarization state may then be imposed on the single photon by transmission through and/or reflection from polarizing optics. In an example embodiment, attenuation may be achieved with a neutral density filter having an attenuation factor of approximately 12 orders of magnitude (transmission approximately $10^{-12}$). According to an example embodiment, the attenuator may be placed in the path of the laser source to reduce the output to approximately 0.5 to 1.5 single photons per second.

Various components for establishing a ground-to-satellite, or satellite-to-satellite QKD system, according to example embodiments of the invention, will now be described with reference to the accompanying figures.

FIG. 1 illustrates an example diagram of an illustrative satellite communications system 100, according to an example embodiment of the invention. According to an example embodiment, a ground station 106 may communicate QKD signals 108 to/from a telescope system 104 on a first satellite 102. In another example embodiment, one or more additional satellites 110 may communicate QKD signals 112 to/from the first satellite 102.

According to example embodiments of the invention, the main QKD signal transmitter may be ground based, and one or more satellites 102, 110 may receive the QKD signals. In another example embodiment, QKD transmitters may be associated with one or more of the satellites 102, 110, and the ground station 106 may include a receiver. In other example embodiments, the ground station 106, the first satellite 102, and/or additional satellites 110 may include telescopes and transceivers that permit transmitting and/or receiving the QKD signals.

Figure 2:
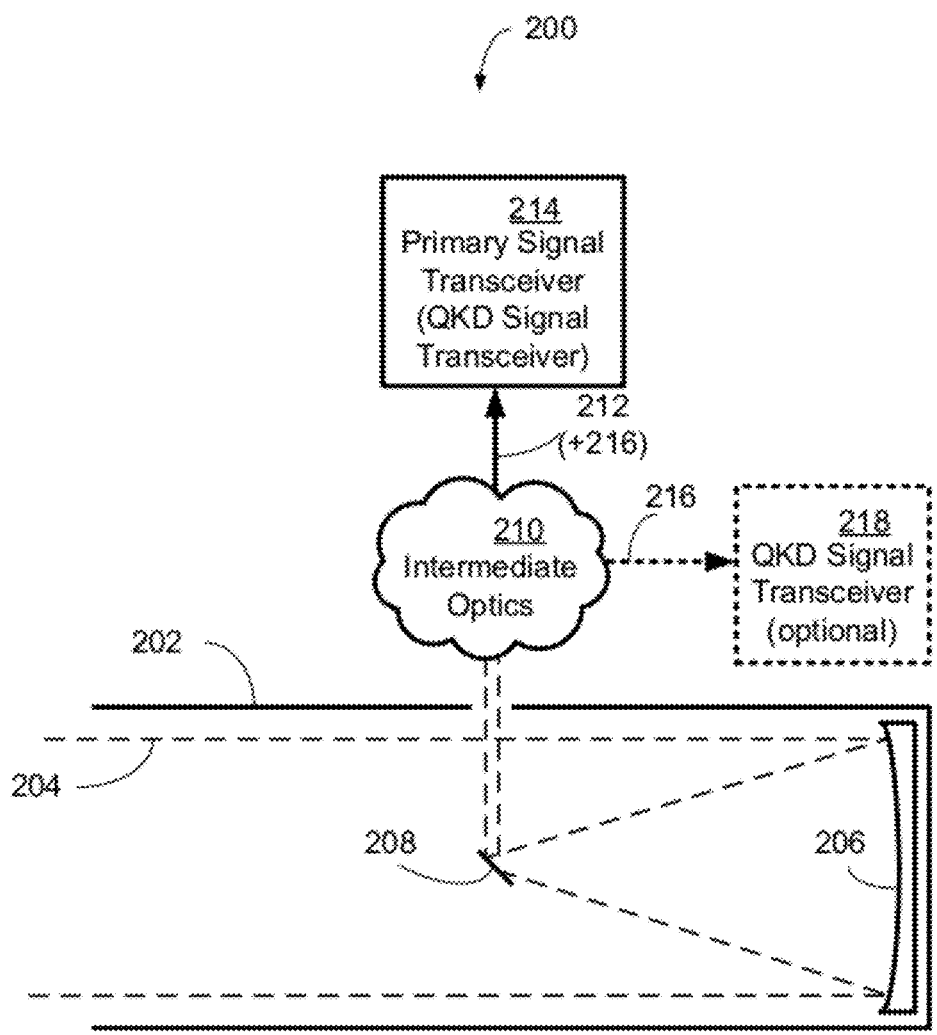
FIG. 2 is a block diagram of an illustrative QKD system with a reflective telescope, according to an example embodiment of the invention.

FIG. 2 depicts a block diagram of an illustrative QKD receiver system 200 with a reflective (Newtonian) telescope 202, according to an example embodiment of the invention. In an example embodiment, light signals 204 may enter the telescope 202. The light signals 204 may include both primary signals 212 and QKD signals 216. According to an example embodiment, the light signals 204 may reflect off a curved mirror 206. In an example embodiment, the concentrated beam or rays may reflect from another smaller mirror 208 within the telescope 202, and may exit the telescope cavity to intermediate optics 210 that may be utilized to filter and/or separate the QKD signal 216 and the primary signal 212 for separate detecting and/or processing.

According to an example embodiment of the invention, a combined primary signal transceiver and QKD signal transceiver 214 may be utilized to process the respective primary signal 212 and the QKD signal 216. According to another example embodiment of the invention, the intermediate optics 210 may be utilized, at least in part, to separate the primary signal 212 and the QKD signal 216; and the primary signal transceiver 214 may be utilized to process the primary signal 212 while a stand-alone QKD signal transceiver 218 may be utilized to process the QKD signal 216.

Figure 3:
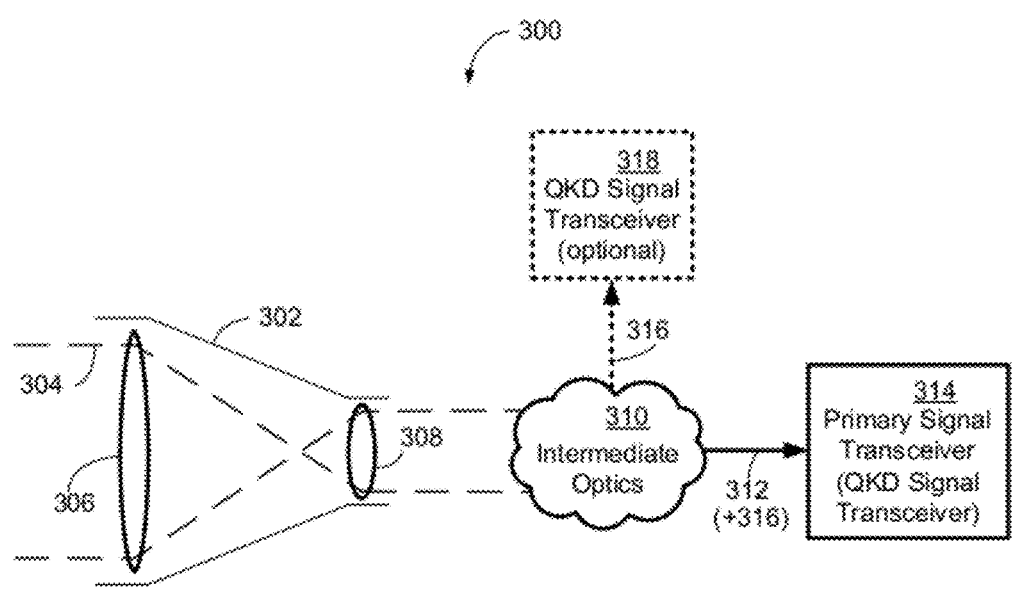
FIG. 3 is a block diagram of an illustrative QKD system with a transmissive telescope, according to an example embodiment of the invention.

FIG. 3 depicts a block diagram of an illustrative QKD receiver system 300 with a transmissive (Keplerian) telescope 302, according to an example embodiment of the invention. In an example embodiment, light signals 304 may enter the telescope 302. In this example embodiment, a first lens 306 may at least partially define the aperture for the input light. In an example embodiment, the light signals 304, which may include both primary signals 312 and QKD signals 316 may encounter a second smaller lens 308. In an example embodiment, the resulting concentrated beam or rays may then interact with intermediate optics 310 that may be utilized to filter and/or separate the QKD signal 316 and the primary signal 312 for separate detecting and/or processing.

According to an example embodiment of the invention, a combined primary signal transceiver and QKD signal transceiver 314 may be utilized to process the respective primary signal 312 and the QKD signal 316. According to another example embodiment of the invention, the intermediate optics 310 may be utilized, at least in part, to separate the primary signal 312 and the QKD signal 316; and the primary signal transceiver 314 may be utilized to process the primary signal 312 while a stand-alone QKD signal transceiver 318 may be utilized to process the QKD signal 316.

Figure 4:
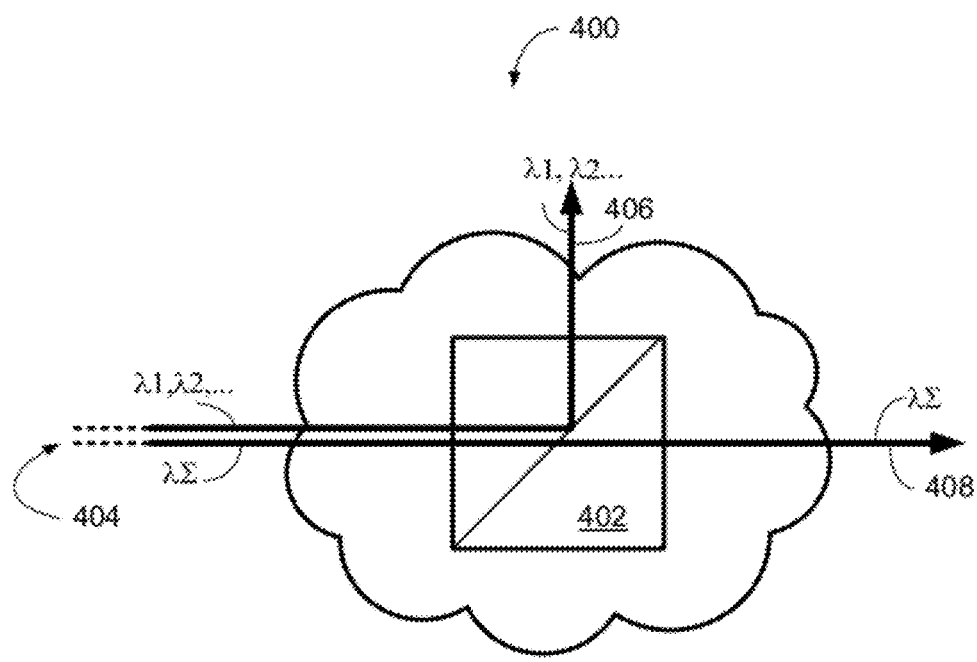
FIG. 4 is a diagram of an illustrative beam splitter for directing light as a function of wavelength and/or polarity, according to an example embodiment of the invention.

FIG. 4 depicts an example of a wavelength beam splitter 402 (for example, a dichroic beam splitter) that may be present within the intermediate optics 210, 310. For example, input wavelengths 404 may include the general primary signal 408 spectrum sum of wavelengths X and QKD signal 406 wavelengths $\lambda 1, \lambda 2, \ldots$, which may be gathered from the telescope. In an example embodiment, the beam splitter 402 may separate the QKD signal 406 wavelengths $\lambda 1, \lambda 2, \ldots$, and primary signal 408 spectrum sum of wavelengths X into separate paths for separate detection and processing. As mentioned above, however, it is not necessary to color-code the QKD signal 406, so such a signal may include a single wavelength $\lambda$, or a finite spectrum band around a center wavelength $\lambda$, which may be separated by similar means for processing.

Figure 5:
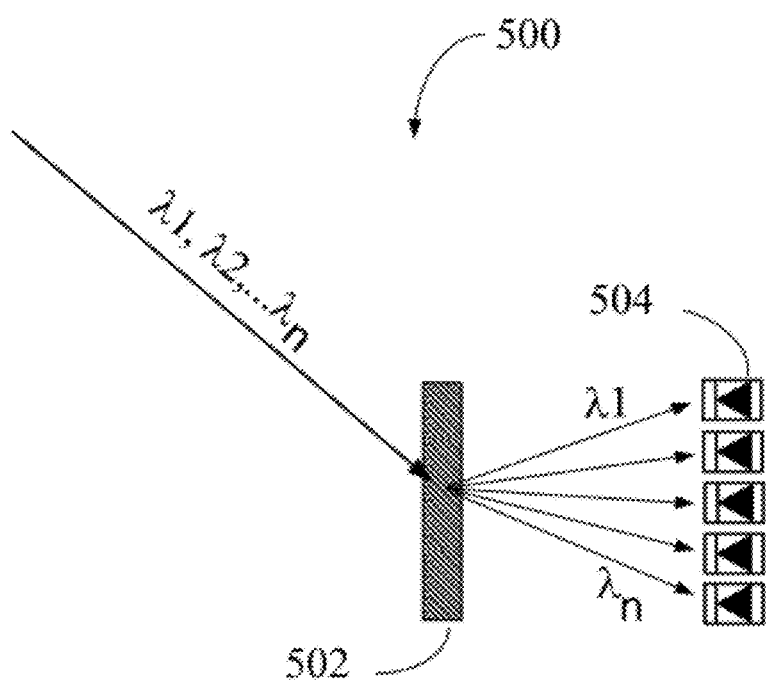
FIG. 5 is a diagram of an illustrative grating-based demultiplexer for diffracting light as a function of wavelength, according to an example embodiment of the invention.

FIG. 5 depicts an example embodiment of a grating-based demultiplexer 500 that may be utilized to separate various color-coded signals. In an example embodiment, an input signal may include a plurality of wavelengths, $\lambda 1, \lambda 2, \ldots, \lambda n$. In an example embodiment, the input signal may represent a QKD signal, and the grating-based demultiplexer 500 may be part of the QKD signal transceiver 218, 318 described above. In an example embodiment, the grating 502 may be either a transmission grating (for example a Bragg grating as shown) or a reflection type grating. According to example embodiments of the invention, the grating 502 may be utilized to diffract and angularly separate the input wavelengths for separate detection by individual detectors 504.

Figure 6:
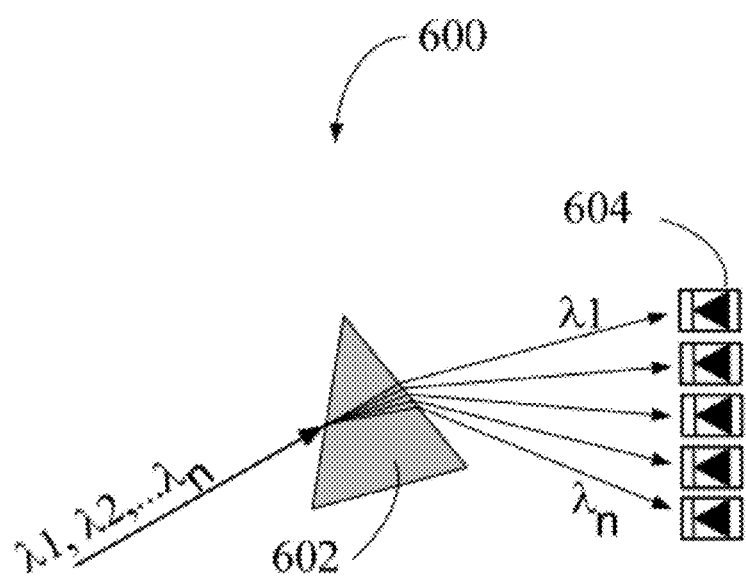
FIG. 6 is a diagram of an illustrative prism-based demultiplexer for refracting light as a function of wavelength, according to an example embodiment of the invention.

FIG. 6 depicts an example embodiment of a prism-based demultiplexer 600 that may be utilized to separate various color-coded signals. In an example embodiment, an input signal may include a plurality of wavelengths, $\lambda 1, \lambda 2, \ldots, \lambda n$. In an example embodiment, the input signal may represent a QKD signal, and the prism-based demultiplexer 600 may be part of the QKD signal transceiver 218, 318 described above. According to example embodiments of the invention, the prism 602 may be utilized to refract and angularly separate the input wavelengths for separate detection by individual detectors 604.

Figure 7:
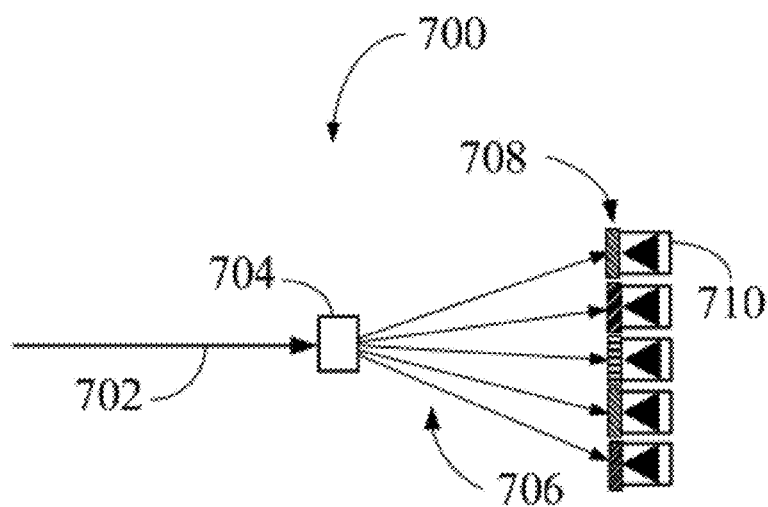
FIG. 7 is a diagram of an illustrative splitter and polarization analyzer receiver, according to an example embodiment of the invention.

FIG. 7 depicts an example embodiment of a receiver 700 that may be utilized for analyzing the input QKD signal according to polarization. In this simplified example embodiment, the incident QKD signal 702 may be split or divided into two or more light paths 706. In accordance with certain example embodiments of the invention, polarizer analyzers 708 may be utilized to pass QKD signal photons to the detectors 710 when the photons are polarized according to the axis of polarization of the analyzers 708. According to a similar example embodiment (not shown), the splitter 704 may be eliminated, an electro-optic modulator may replace the multiple fixed analyzers 708, and a single detector may replace the multiple detectors 710 that are shown in FIG. 7. Electronic control of the electro-optic modulator may allow rotation of the analyzer polarization axis to allow QKD signal photons to pass to the detector when they are aligned with the set polarization axis of the electro-optic analyzer.

According to example embodiments of the invention, timing signals, precise clocks, laser beacons, etc., may be utilized to synchronize the timing of the generation and detection process, which may require sub 10 ns precision. In an example embodiment, a QKD-transmitting satellite may acquire and lock-on to a laser beacon signal from a QKD-receiving ground station. According to an example embodiment, the QKD-transmitting satellite may use the laser beacon signal as a timing master for synchronizing single photon generation, and for performing privacy amplification and error correction on the transmitted qubit stream.

Figure 8:
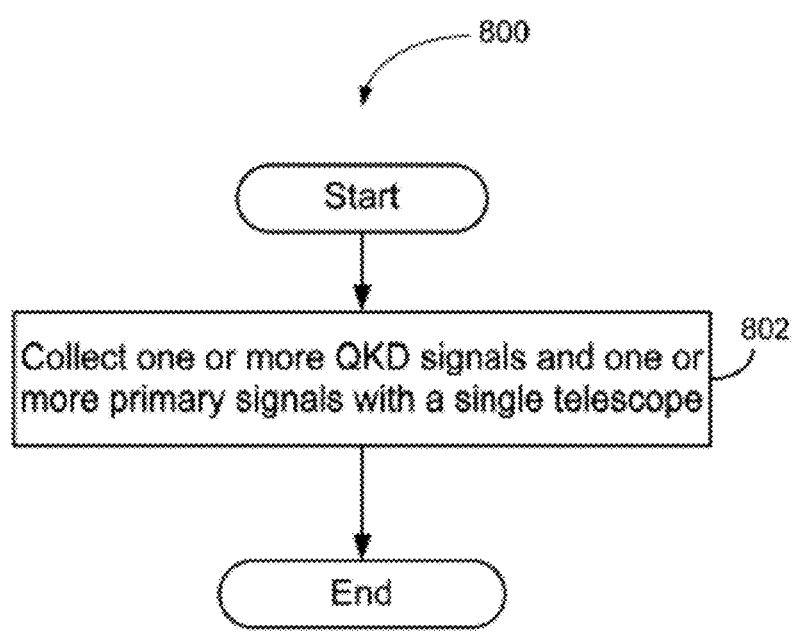
FIG. 8 is a flow diagram of a method for receiving quantum key distribution signals, according to an example embodiment of the invention.

An example method 800 for receiving a quantum key distribution signal is depicted in FIG. 8. The method 800 starts in block 802 and includes collecting one or more QKD signals and one or more primary signals with a single telescope. The method 800 ends after block 802.

According to example embodiments, one or more QKD signals and the one or more primary signals may be collected with a single telescope associated with a satellite. In an example embodiment, collecting the one or more QKD signals may include collecting single photons with the single telescope. According to an example embodiment, collecting the one or more primary signals may include focusing or imaging ultraviolet, visible, or infrared light for detection. In an example embodiment, receiving a quantum key distribution signal may further include separating the one or more QKD signals and the one or more primary signals according to one or more of: wavelength or polarization. In an example embodiment, receiving a QKD signal may further include separately detecting the one or more QKD signals and the one or more primary signals. According to an example embodiment, the one or more QKD signals and the one or more primary signals may be collected with one or more of: a reflective telescope, a refractive telescope, or a catadioptric telescope.

According to another example embodiment, a system is provided for receiving one or more quantum key distribution (QKD) signals and one or more primary signals. The system includes a single telescope that collects one or more QKD signals and one or more primary signals. The system also includes intermediate optics that modify the one or more primary signals and the one or more QKD signals. The system includes one or more primary signal transceivers that receive and detect the one or more primary signals; and one or more QKD signal transceivers that receive and detect the one or more QKD signals. In an example embodiment, the single telescope may attach to a satellite. In an example embodiment, the intermediate optics are further operable for one or more of: filtering, splitting, amplifying, attenuating, or redirecting input photons according to one or more of: wavelength or polarization. According to an example embodiment, the intermediate optics may comprise at least one dichroic beam splitter.

In an example embodiment, the system may further include one or more detectors for detecting one or more QKD signals. In an example embodiment, the system may include one or more of: at least one grating or at least one prism for angularly separating the one or more QKD signals by wavelength. In an example embodiment, the single telescope may include one or more of: a reflective telescope, a refractive telescope, or a catadioptric telescope. According to an example embodiment, the system may include at least one polarizer for manipulating the one or more primary signals or the one or more QKD signals by polarization. In an example embodiment, the system may further comprise at least one waveplate for manipulating the one or more primary signals or the one or more QKD signals by polarization.

According to another example embodiment, an apparatus is provided. The apparatus includes a single telescope that collects one or more quantum key distribution (QKD) signals and one or more primary signals. The single telescope may be a reflective telescope, a refractive telescope, or a catadioptric telescope, and the single telescope may attach to a satellite. The apparatus may further include intermediate optics operable for one or more of filtering, splitting, amplifying, attenuating, or redirecting input photons according to one or more of wavelength or polarization. In an example embodiment, intermediate optics may include at least one dichroic beam splitter. In an example embodiment, the apparatus may include at least one polarizer for manipulating the one or more primary signals or the one or more QKD signals according to polarization.

In an example embodiment, at least one waveplate may be included in the apparatus for manipulating the one or more primary signals or the one or more QKD signals according to polarization. In an example embodiment, the apparatus may further include one or more detectors for detecting one or more QKD signals. In an example embodiment, the apparatus may further include one or more of: at least one grating or at least one prism for angularly separating the one or more QKD signals by wavelength.

Accordingly, example embodiments of the invention can provide the technical effects of creating certain systems, methods, and apparatus that may make it possible to include quantum key distribution in satellites. Example embodiments of the invention can provide the further technical effects of providing systems, methods, and apparatus for reducing the weight and/or cost associated with free space quantum key distribution telescopes.

In example embodiments of the invention, the telescope systems 200 and 300 may include any number of hardware and/or software applications that are executed to facilitate any of the operations.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for receiving a quantum key distribution (QKD) signal, the method comprising:
    collecting, by a single telescope, one or more light signals comprising one or more QKD signals and one or more imaging signals;
    filtering, by intermediate optics, the one or more light signals into the one or more QKD signals and the one or more imaging signals;
    detecting the one of more imaging signals with one or more primary signal transceivers; and
    detecting the one or more QKD signals with one or more QKD signal transceivers.

2. The method of claim 1, wherein filtering the one or more QKD signals comprises filtering single photons with the single telescope.

3. The method of claim 1, wherein collecting the one or more imaging signals comprises imaging ultraviolet, visible, or infrared light for detection.

4. The method of claim 1, further comprising separating the one or more QKD signals and the one or more imaging signals according to one or more of: wavelength or polarization.

5. The method of claim 1, further comprising separately detecting the one or more QKD signals and the one or more imaging signals.

6. The method of claim 1, wherein the one or more QKD signals and the one or more imaging signals are collected with one or more of: a reflective telescope, a refractive telescope, or a catadioptric telescope.

7. A system for receiving one or more quantum key distribution (QKD) signals and one or more remote sensing signals, the system comprising:
    a single telescope that collects one or more light signals comprising one or more QKD signals and one or more imaging signals;
    intermediate optics that filter the one or more QKD signals and the one or more imaging signals;
    one or more primary signal transceivers that receive and detect the one or more imaging signals; and
    one or more QKD signal transceivers that receive and detect the one or more QKD signals.

8. The system of claim 7, wherein the single telescope attaches to a satellite.

9. The system of claim 7, wherein the intermediate optics are further operable for one or more of filtering, splitting, amplifying, attenuating, or redirecting input photons according to one or more of: wavelength or polarization.

10. The system of claim 9, wherein the intermediate optics comprise at least one dichroic beam splitter.

11. The system of claim 7, further comprising one or more detectors for detecting one or more QKD signals.

12. The system of claim 7, further comprising one or more of: at least one grating or at least one prism for angularly separating the one or more QKD signals by wavelength.

13. The system of claim 7, wherein the single telescope comprises one or more of: a reflective telescope, a refractive telescope, or a catadioptric telescope.

14. The system of claim 7, further comprising at least one polarizer for manipulating the one or more imaging signals or the one or more QKD signals by polarization.

15. The system of claim 7, further comprising at least one waveplate for manipulating the one or more imaging signals or the one or more QKD signals by polarization.

16. An apparatus comprising:
a single telescope that collects one or more light signals, wherein the single telescope comprises one or more of: a reflective telescope, a refractive telescope, or a catadioptric telescope;
intermediate optics that filter the one or more light signals into one or more quantum key distribution (QKD) signals and one or more imaging signals;
one or more QKD signal transceivers that receive and detect the one or more QKD signals; and
one or more primary signal transceivers that receive and detect the one or more imaging signals.

17. The apparatus of claim 16, wherein the single telescope attaches to a satellite.

18. The apparatus of claim 16, further comprising intermediate optics operable for one or more of filtering, splitting, amplifying, attenuating, or redirecting input photons according to one or more of wavelength or polarization.

19. The apparatus of claim 18, wherein the intermediate optics comprise at least one dichroic beam splitter.

20. The apparatus of claim 18, further comprising at least one polarizer for manipulating the one or more imaging signals or the one or more QKD signals according to polarization.

21. The apparatus of claim 18, further comprising at least one waveplate for manipulating the one or more imaging signals or the one or more QKD signals according to polarization.

22. The apparatus of claim 16, further comprising one or more detectors for detecting one or more QKD signals.

23. The apparatus of claim 16, further comprising one or more of: at least one grating or at least one prism for angularly separating the one or more QKD signals by wavelength.

* * * * *